United States Patent [19]

Shepherd et al.

[11] 4,155,394
[45] May 22, 1979

[54] TIRE CORD COMPOSITE AND PNEUMATIC TIRE

[75] Inventors: Philip D. Shepherd, Midland, Mich.; Roop S. Bhakuni, Copley, Ohio

[73] Assignee: The Goodyear Tire & Rubber Company, Akron, Ohio

[21] Appl. No.: 829,103

[22] Filed: Aug. 29, 1977

[51] Int. Cl.$^2$ .................. B60C 5/00; B32B 27/02
[52] U.S. Cl. .................. 152/359; 57/237; 57/238 R; 139/426 R; 428/139; 260/37 N; 57/902
[58] Field of Search .................. 152/355-359, 152/360-361; 428/139, 298, 288; 57/140 BY, 140 R; 260/37 N

[56] References Cited

U.S. PATENT DOCUMENTS

| | | | |
|---|---|---|---|
| 2,235,867 | 3/1941 | Castricum et al. | 152/359 |
| 3,217,778 | 11/1965 | Kovac et al. | 152/359 |
| 3,253,638 | 5/1966 | Kersker et al. | 152/359 |
| 3,393,210 | 7/1968 | Speck | 260/37 N |
| 3,956,561 | 5/1976 | Anderson et al. | 428/288 |
| 3,969,568 | 7/1976 | Sperley | 428/298 |

Primary Examiner—Albert J. Makay
Assistant Examiner—Lawrence E. Williams
Attorney, Agent, or Firm—H. C. Young, Jr.

[57] ABSTRACT

A cord composite suitable for rubber tire reinforcement comprised of a plurality of plies of yarns selectively cabled in a manner so that, upon application of longitudinal stress, at the initial elongation of the cable, the primary load bearing ply is a polyester or a nylon yarn and so that after appreciable elongation of the cable, the primary load bearing yarn is an aramid yarn. The invention further relates to a pneumatic rubber tire, industrial belt or hose having a carcass containing a fabric of such a cord as a reinforcing member.

18 Claims, 6 Drawing Figures

U.S. Patent  May 22, 1979  4,155,394
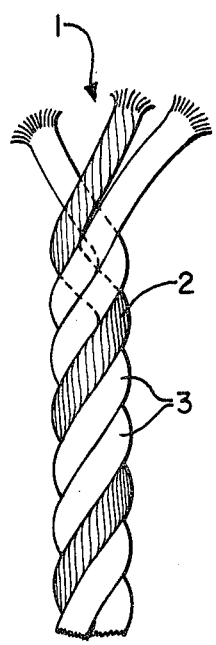
FIG. IA
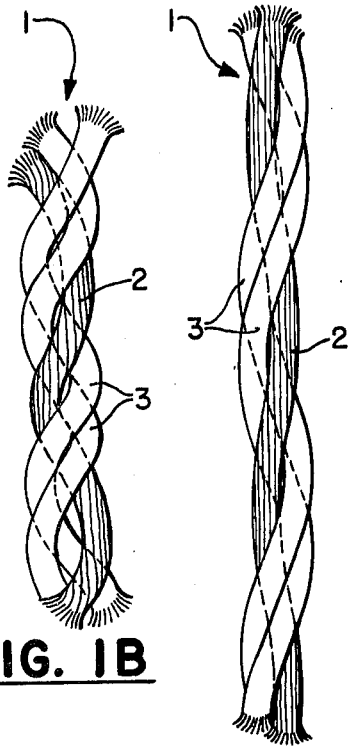
FIG. IB
FIG. IC
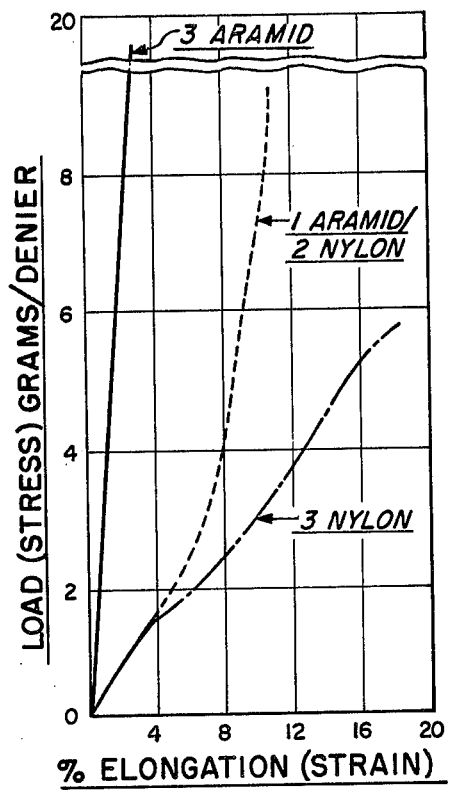
FIG. 2
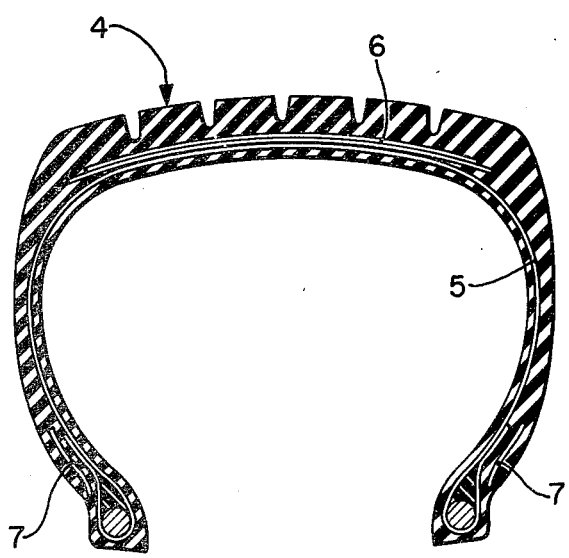
FIG. 4
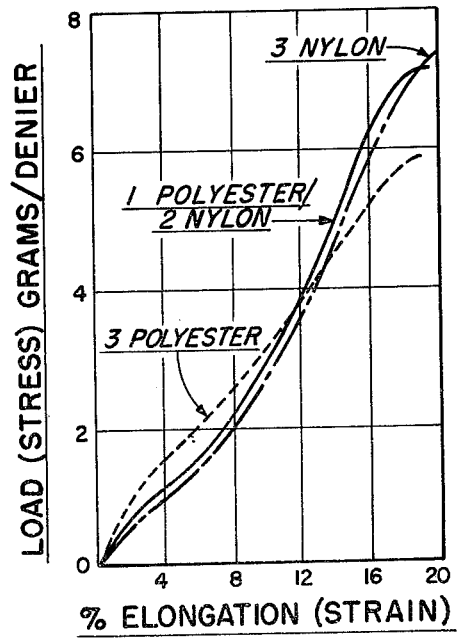
FIG. 3

TIRE CORD COMPOSITE AND PNEUMATIC TIRE

This invention relates to a composite of a plurality of dissimilar individual textile yarns cabled, or twisted, together as plies to form a cord. The invention particularly relates to a pneumatic rubber tire composite containing an integral cord reinforcement of such cabled textile yarns.

Cabled plies of nylon or polyester yarns have heretofore been found to provide satisfactory tire reinforcement cord for many purposes. However, such nylon or polyester cords have also been deficient in various regards. It was, accordingly, desired to provide a tire reinforcement cord with both nylon and polyester plies to gain their combined properties.

Consequently, it was heretofore found that a satisfactory tire cord could be made of cabled nylon and polyester plies if the individual residual twist ratios of the nylon and the polyester yarns were balanced so that their modulii at a predetermined load were practically the same. The yarn with the normally higher modulus would be twisted more to reduce its modulus and bring it into balance with the other yarn (See. U.S. Pat. No. 3,419,059). Also, the total, overall amount of residual twist in the yarns in the cable was adjusted so that as load increased, the plies would break substantially simultaneously.

Therefore, such a cord was designed to be composed of plies of individual cabled yarns of nylon and polyester having a balance of residual twists so that they provide substantially equal support of the load or stress as the cable is stretched, and so that they break at substantially the same time.

Twisting a yarn generally increases its overall stretchability and reduces modulus. The cabling of nylon and polyester yarns to form tire reinforcement cord works because the yarns already have similar modulii so that extension modification by twisting is not necessary.

Therefore, tire reinforcement cord fabrics have been conveniently made with plies of somewhat extensible, or stretchable, nylon and/or polyester yarns which can repeatedly be substantially stretched for relatively short extensions and returned to their original length with only minimal permanent deformation.

For example, a nylon yearn having a highly beneficial resistance to flex and cyclic fatigue, but with a high total shrinkage factor, can be cabled with a polyester yarn having a lower resistance to flex and cyclic fatigue yet highly beneficial low total shrinkage factor to create a cable, or cord, having a high resistance to flex and cyclic fatigue and lower shrinkage factor. This phenomena can be accomplished by manipulating the twist in the individual yarns, primarily because both the modulii and breaking strengths of the nylon and polyester yarns are already similar. In other words, the amount of twist required for the nylon yarn is not greatly different than the twist required for the polyester yarn. If a large disparity or difference of twist was required between the yarns, then the ultimate breaking strength of at least one of the yarns would be expected to be greatly degraded or damaged.

However, for many applications, it is highly desirable that tire reinforcement cord have a substantially greater modulus and breaking strength than that which is ordinarily obtainable from nylon and polyester yarns, even when cabled together. In this regard, a suitable yarn which can provide such high modulus and breaking strength is a yarn of essentially inextensible or non-stretchable aromatic polyamide, generically known as aramid. However, such aramid yarns are typically deficient in their resistance to flex and cyclic fatigue, largely due to their characteristically higher modulus.

Indeed, it is highly desirable that a tire reinforcement cord be provided which contains the enhanced resistance to flex and cyclic fatigue of a nylong yarn, a relatively low modulus of either nylon or polyester yarn and the great breaking strength of the aramid yarn.

However, forming a cord by cabling or helically twisting, aramid yarn with nylon and/or polyester yarns with sufficient twist in the aramid yarn to equate its modulus with nylon or polyester yarns has been found to be impractical. Indeed so much twist is required of the aramid yarn to reduce its high modulus that its already deficient fatigue resistance is further reduced. The twisted aramid yarn itself is near its breaking point due both to the high twist itself and due to the abrasion effect of the tightly twisted yarn as it rubs against itself in service. Indeed, the aramid yarn actually tends to cut itself in service as a tire reinforcement cord ply at high twist levels.

In accordance with this invention, it has been discovered that a cord composite having an enhanced value for rubber tire reinforcement comprises a plurality of plies of individual textile yarns helically cabled together comprised of one to six, preferably one, ply of an aramid yarn and one to twelve, preferably one to two, plies of yarns individually selected from at least one of polyester and nylon, where the ratio of the total nylon and polyester plies to aramid plies is from 1/1 to 4/1, preferably 1/1 to 2/1, where said cord composite has an individual yarn twist amount and ratio and cabled twist so that, upon application of longitudinal stress, at the initial elongation of the cable, the primary load bearing ply is the polyester or nylon yarn, and so that after appreciable elongation of the cable, the primary load bearing yarn is the aramid yarn.

Therefore, in further accordance with this invention, in a textile cord comprised of plies of cabled yarns, the improvement which comprises a cord composite comprised of a plurality of dissimilar plies of individual yarns helically cabled together, having one to six, preferably one ply of aramid yarn characterized by having a modulus at one percent elongation and at a twist of about one turn per inch, in the range of about 250 to about 600, preferably about 300 to about 550 grams per denier, and one to twelve plies individually selected from polyester or nylon yarns characterized by having a modulus at one percent elongation, and at a twist of about one turn per inch, in the range of about 20 to about 100, preferably 25 to about 60 grams per denier, where said yarns are cabled by twisting together helically about one another to form a cord having a twist of cabled yarns, or plies, in the range of about two to about 16, preferably about eight to about 14, turns per inch, where said aramid yarn has a residual twist in its ply in the range of about one to about six turns per inch opposite the cord twist and said polyester or nylon yarn has a residual twist in its ply in the range of about 0 to about 0.5 turns per inch opposite the cord twist, so that (A) at an initial cord elongation, under an initial longitudinal tensile stress, the primary load bearing ply is the polyester or nylon as such yarn stretches while said aramid yarn extends without appreciable stretch, and (B) after additional elongation of the cord, under appreciable additional longitudinal tensile stress, the primary load bearing yarn is the aramid as it reaches substantially full extension.

In the practice of this invention, preferably said cabled yarns break substantially simultaneously at ultimate elongation of said cord.

It is important to appreciate that the utility of the cord of this invention is a departure from the longstanding teaching of balancing individual yarn twist in combination with cabled twists so that each of the individual yarns cooperate to substantially equally support the load, while also breaking at substantially the same longitudinal stress. This longstanding teaching was designed to provide enhanced resistance to flex and cyclic fatigue as well as to provide a substantially simultaneous break of the yarns at failure. Uniquely, such teaching could be conveniently applied to nylon and polyester-type yarns since the amount of twist needed to be imparted to the individual yarns was not greatly different so that the manipulation was relatively easy. However, such longstanding teaching was found to be especially impractical for optimally combining the substantially inextensible aramid yarn with the substantially more extensible polyester or nylon yarns. Indeed, it was found that such a great amount of twist was required of the aramid yarn to bring its modulus into equality with the polyester or nylon yarn so that it would bear an equivalent amount of the load with a similar nylon or polyester yarn, both its breaking strength was so substantially reduced to render the cord composite essentially useless for many tire cord purposes and also its tightly twisted configuration caused it to abrade and cut against itself while flexing.

In the practice of this invention, the modulus of the yarns is the amount of force needed to stretch the yarn to a predetermined elongation. Typically, the modulus of a one percent elongation of a yarn having an original twist of one turn per inch is used as a measure. In this regard, the polyester or nylon yarns typically have a modulus at one percent elongation when it has a twist of about one turn per inch in the range of about 20 to about 100, preferably 25 to about 60 grams per denier. Similarly, the aramid yarn has a modulus of about one percent elongation at a twist of about one turn per inch in the range of about 250 to about 600, preferably about 300 to about 550 grams per denier.

The term denier relates to the weight in grams of 9000 meters of the cord. Therefore, it is a measure of the mass per unit length.

It is important that the individual yarns in the cable ultimately support the load so that they break at about the same stress load. This is to provide a cord in which the individual twisted yarns break at substantially the same time so that a double break is essentially prevented where one yarn breaks early and leaves the entire load to bear upon the remaining yarn.

As it can readily be visualized, the individual yarns are adjusted to have an initial twist in a desired direction. As they are cabled or twisted to form the cable or cord, some of their twist is lost, depending primarily upon the degree of twisting to form the cable itself. For example, the aramid yarn may have an initial twist in the range of about 10 to about 18 and a net residual twist in the cable itself in the range of about two to about six. Correspondingly, the polyester or nylon yarn may have an initial twist in the range of about eight to about 12, and a residual twist in the cable in the range of about 0 to about 0.5.

In the practice of this invention, it has been found that it is desirable that the twist of the yarn to form the cable be in a direction opposite to the individual yarn twist for maximum effectiveness.

The cord, or cabled yarns, of this invention have enhanced utility for use as a tire cord fabric. In this regard, a tire cord fabric can be conveniently provided in the nature of a fabric comprised of about five to about 40, preferably about 10 to about 30, cords per inch on a single ply basis, loosely woven together by what is commonly called a pick or weft cord. To the resulting cord is then applied, such as by calendering, a coating of compounded, unvulcanized rubber, generally having a thickness in the range of about 5 to about 50 mils each side. Such a calendered cord is then used to build the carcass of a pneumatic tire over which is built the conventional tread and other appropriate portions.

It should be appreciated that the yarn itself is comprised of individual fiber filaments. Typically, a nylon yarn bundle can comprise in the range of about 140 to about 210 filaments, a polyester yarn bundle can comprise about 190 to about 250 filaments and an aramid yarn bundle can comprise about 800 to about 1200 filaments. Such filaments generally have a minimal amount of twist to hold them together.

For further understanding of the invention, reference is made to the drawing in which:

FIG. 1 (A-C) is an illustration of a three-ply cable of twisted dissimilar yarns as it is longitudinally stretched;

FIG. 2 is a stress/strain graph showing stress/strain relationships of various three-ply cords of cabled aramid, aramid/nylon and nylon yarns;

FIG. 3 is a stress/strain graph showing stress/strain relationships between three-ply cords of cabled polyester, polyester/nylon and nylon yarns and FIG. 4 is a cross-sectional view of a pneumatic tire showing cord fabric reinforcement contained therein.

Referring to the drawings, in FIG. 1-A a cord (1) of helically cabled dissimilar yarns is shown having a twist of about eight turns per inch comprised of one ply or yarn of aramid (2) having a residual twist of about six turns per inch and two plies or yarns of polyester or nylon (3) having a residual twist of 0.5 turns per inch. In FIG. 1-B, as the cord (1) is initially stretched, the load is primarily taken by the polyester or nylon cord (3) as they elongate by stretching in an axial fashion whereas the essentially inextensible aramid yarn (2), instead of stretching, simply elongates by beginning to straighten out. In FIG. 1-C, as the (1) is stretched further in the longitudinal direction, the polyester or nylon yarn (3) continues to elongate by stretching, until the aramid yarn (2) essentially reaches the limit of is elongation by straightening and then becomes the principal load-bearing member of the cord.

To more clearly illustrate the problems involved in cabling together the yarns to achieve the cooperative effort toward providing a cord suitable for tire reinforcement purposes, reference is made to FIGS. 2 and 3.

In FIG. 2 it can conveniently be seen that a three-ply aramid yarn is substantially inextensible and comparatively undergoes very little elongation whereas a three-ply nylon cord under similar longitudinal load has a very substantially greater elongation. Uniquely, forming a cord of helically cabled yarns containing one aramid ply and two nylon plies by the method of this invention is shown in FIG. 2 to yield a cord having intermediary elongation for a comparable load. In this instance, although the two plies of nylon stretch somewhat axially, the aramid ply, instead of stretching, elongates by tending to straighten out along the centerline of the cord. Through this longitudinal load-bearing phenomena the invention is achieved.

In FIG. 3 it is shown that the load versus elongation of polyester and nylon three-ply cabled yarns are substantially the same. This figure amplifies the convenience of the heretofore teaching to simply adjust the twist of the individual polyester and/or nylon yarn in the cable to achieve a cooperative effort for yarns having substantially equal modulii instead of the teaching of the instant invention. Here, both the polyester and nylon yarns cooperate to bear the load practically throughout the application of longitudinal stress. This is practically possible and desirable because of the similarity of their modulii.

FIG. 4, a cross sectional view of a pneumatic rubber tire, shows a tread (4) and a positioning of a tire reinforcing fabric in the carcass ply (5), belt (6) and chipper (7) of a cord of this invention which is comprised of the plies of helically cabled dissimilar yarns.

Indeed, the invention further relates not only to the fabric of the cord of this invention suitable for pneumatic rubber tire reinforcement, but also to a pneumatic rubber tire comprised of a carcass with a tread over the road engaging portion of the carcass and said fabric reinforcement within the body of said carcass in at least the portion thereof opposite said tread, particularly in the form of a reinforcing carcass, belt or chipper member.

In the practice of this invention, suitable polyester yarns are prepared from filaments of high molecular weight linear polyesters which can be drawn into a pliable strong and elastic fiber having a high degree of orientation along the fiber axis. Such polyesters may be obtained by reacting a glycol such as ethylene glycol, propylene glycol and the like, with dicarboxylic acids, such as, for example, terephthalic acid, isophthalic acid, stilbene carboxylic acid and the like. Representative of suitable polyesters may be found as set forth in U.S. Pat. Nos. 2,965,613 and 2,465,319. Generally, it is preferred that the polyester is comprised of at least 85% ethylene glycol terephthalate.

In the practice of this invention, the nylon yarn is comprised of filaments of nylon. Nylon is recognized as a manufactured fiber in which the fiber-forming substance is a long chain synthetic polyamide in which the amide linkages are attached directly to one or more aliphatic or cycloaliphatic groups. Representative of a nylon is poly (hexamethylene adipamide).

In the further practice of this invention, the aramid is a manufactured fiber in which the fiber-forming substance is generally recognized as a long chain synthetic aromatic polyamide in which at least 85% of the amide linkages are attached directly to two aromatic rings. Representative of an aramid is a poly(p-phenyleneterephthalamide).

The practice of this invention is further illustrated by reference to the following examples which are intended to be representative rather than restrictive of the scope of the invention. Unless otherwise indicated, all parts and percentages are by weight.

EXAMPLE I

A series of tire cords were made by helically cabling twisted yarns of nylon and aramid yarns and identified herein as Experiments A-E and also Experiment F in which a tire cord preparation was attempted but failed because the aramid yarn broke at the high twist level. The cords were three ply, meaning that they were composed of three cabled yarns, two nylon and one aramid.

In these experiments 1260 denier nylon and 1500 denier aramid were individually twisted at rates of various turns per inch identified as "twist". From the twisted yarns, tire cords were then made by cabling (twisting) various pre-twisted yarns together in a direction opposite from that of the yarn twist. The yarns were of an "s" twist and the cords were of a "z" twist. A cord ply twist of 8 turns per inch was used for all of the cords.

The polyester yarn was primarily of the ethylene glycol terephthalate type and had a modulus of about 2.0 grams per denier at an elongation of 3 percent. The nylon was of the poly(hexamethylene adipamide)-type characterized by having a modulus at 3 percent elongation of about 0.8 gram per denier.

The aramid yarn was of the poly(p-phenylene-terephthalamide) type characterized by having a modulus at 1 percent elongation of about 3 to 4 grams per denier.

The make-up of the various yarns and tire cords are more clearly shown in the following Table 1, exhibiting residual twists.

Table 1

| | CORD PREPARATION | | | |
|---|---|---|---|---|
| Exp | Nylon Yarn Twist | Aramid Yarn Twist | Cord Ply Twist | Cord Condition |
| A | 8 s | 8 s | 8 z | Acceptable[1] |
| B | 8 s | 12 s | 8 z | Acceptable[1] |
| C | 6 s | 8 s | 8 z | Acceptable[1] |
| D | 8 s | 10 s | 8 z | Acceptable[1] |
| E | 10 s | 8 s | 8 z | Acceptable[1] |
| F | 8 s | 25 s | 8 z | Aramid yarn broke during twisting |

[1]Acceptable for further processing to make tire reinforcement cord fabric.

It should be noted that Experiment F was an attempt to provide a cord with nylon and aramid plies of substantially the same modulii at a given load in accordance with prior practice. In other words, the purpose was to provide a conventional-type cord in which the individual yarns substantially shared the load. In this regard, it was unable to achieve such a result, since such a high twist ratio of aramid yarn was needed to approach the modulus of nylon yarn at a practical elongation, that the aramid yarn actually broke during twisting. Indeed, even if sufficient twist in the aramid could be obtained, the resulting yarn or cord would be impractical since the aramid yarn would be abraiding against itself and since its breaking strength would be severely degraded.

The following Table 2 shows the physical properties of the tire cords of Experiments A-E. The properties are of a greige, or untreated, cord. Experiments G and H are shown to illustrate comparative physical properties of individual aramid and nylon cords of three cabled yarns each. The aramid yarn/cord twist ratio was 7/7 and the nylon yarn/cord twist ratio was 8/8.

Table 2

| | GREIGE CORD PROPERTIES - BEFORE PROCESSING | | | | |
|---|---|---|---|---|---|
| Exp | Tensile Strength (lb) | Lase at[1] 7% (lb) | Lase at[1] 14% (lb) | Ult. Elong. | Type of Break |
| A | 77.4 | 18.4 | — | 13.5 | Double break |
| B | 84.1 | 15.1 | 63.0 | 15.7 | Double break |
| C | 82.0 | 14.3 | 62.4 | 15.6 | Double break |
| D | 91.2 | 13.5 | 49.5 | 18.4 | Single break |

Table 2-continued

GREIGE CORD PROPERTIES - BEFORE PROCESSING

| Exp | Tensile Strength (lb) | Lase at[1] 7% (lb) | Lase at[1] 14% (lb) | Ult. Elong. | Type of Break |
|---|---|---|---|---|---|
| E | 73.2 | 20.2 | — | 12.4 | Single/double /break |
| G (aramid) | 195 | — | — | 5.0 | Single break |
| H (nylon) | 71.0 | 12.0 | 26.0 | 24 | Single break |

[1] Lase indicates a load at a predetermined elongation. For example, in Experiment A, a load of 18.4 pounds at a 7% elongation.

In Table 2, the test results are an average of five tests. In Experiments A, E and G, the cords broke before reaching 14 percent elongation, with cord G, the cabled aramid yarns, breaking before a 7 percent elongation could be reached.

The cords were then dipped on a continuous basis in an equeous solution of a conventionally used resorcinol/formaldehyde latex, (RFL), adhesive for many purposes. The RFL adhesive was an aqueous latex of vinyl pyridine/butadiene-styrene rubber containing a resorcinol/formaldehyde resin and a blocked isocyanate. More specifically, the cord was in continuous fashion (1) first passed through a first dip stage of such adhesive for a period of about ⅛ to 1 second, under a tension of about ½ to ¾ pounds tension per cord at a temperature of about 25° C., (2) passed through a first drying stage at about 230° C. under a tension per cord of about 2½ to 3½ pounds for about 1 minute, (3) passed through a second dip stage for a period of about ½ to 1 second, under a cord tension of about 1½ pounds at a temperature of about 30° C. and finally, (4) passed through a final drying stage for a period of about 60 seconds, under a cord tension of about 1½ pounds and a temperature of about 240° C.

The processed cords were then tested for physical properties as shown in the following Table 3. Table 4 shows physical properties obtained from cord fabric-reinforced cured rubber prepared with a tire cord fabric of the processed cords of Experiments A-E and G-H by calendering rubber onto the fabric.

In Table 4, the rubber (cord-fabric reinforced) samples were cured for 11 minutes at about 155° C. Samples C and D are judged the best combination (balance) of tensile strength, flex fatigue resistance, lase and ultimate elongation. Generally, a combination of high fatigue resistance and high tensile strength are most desirable properties.

The following Table 5 shows properties of cord which was dipped in a dilute RFL aqueous solution and processed in scaled up production sized equipment instead of the laboratory processed cord of Example II.

Table 5

| Experiment | Three Ply Nylon Control Cord I | J | Three Ply Cords K |
|---|---|---|---|
| Twist (turns/inch) | 8 nylon/8 nylon/ 8 cord | 8 nylon/ 10 aramid/ 8 cord | 8 nylon/ 12 aramid/ 8 cord |
| Tensile(lbs) | 71.9 | 95.4 | 99.6 |
| Lase at 7% (lb) | 18.1 | 33.2 | 24.0 |
| Total Shrink (%) | 9.7 | 5.5 | 5.9 |
| Perm. Shrink (%) | 7.8 | 3.3 | 3.5 |
| Fatigue Resistance (kilocycles) | 233 | 234 | 210 |

The results of Table 5 confirm the values found from laboratory size processing unit. Again, the 8/12/8 twist gave a higher breaking strength, and a Lase at 7% closer approximating nylon. Fatigue resistance was equivalent. As before, the yarns were twisted in an "s" direction and then cabled in a reverse "z" direction.

EXAMPLE II

Cords of cabled yarns of different ratios of nylon, an aramid yarn plies, with essentially optimum yarn and cord twist levels were made and the resulting untreated, or greige, cords tested. The results are shown in the following Table 6.

TABLE 3

CORD PROPERTIES - AFTER PROCESSING

| Experiment | A | B | C | D | E | G (nylon) Std. | G (nylon) L. T. | (aramid) H |
|---|---|---|---|---|---|---|---|---|
| Tensile (lbs) | 79.1 | 84.3 | 84.4 | 88.2 | 77.1 | 72.0 | 60.0 | 186 |
| Lase at 7 (lbs) | 25.2 | 21.2 | 22.9 | 17.8 | 28.1 | 22.0 | 11.5 | — |
| Lase at 14 (lbs) | — | 78.7 | — | 63.4 | — | 44.0 | 28.6 | — |
| Ult Elong (%) | 12.5 | 14.5 | 13.8 | 16.7 | 11.5 | 18.0 | 22.5 | 5.0 |
| Work to break | 1571.1 | 1950.6 | 1861.5 | 2416.0 | 1413.2 | | | |
| Total Shrink (%) | 3.6 | 3.5 | 3.6 | 3.7 | 3.4 | 9.0 | 11.0 | 1.1 |
| Permanent Shrink (%) | 2.1 | 1.9 | 1.9 | 2.1 | 1.9 | 7.5 | 9.0 | 0.6 |

TABLE 4

IN-RUBBER PROPERTIES

| Experiment | A | B | C | D | E | G (nylon) Std. | G (nylon) L. T. | (aramid) H |
|---|---|---|---|---|---|---|---|---|
| Peel Adhesion | | | | | | | | |
| 1" strip | | | | | | | | |
| 11 min at 310° F. | 445 | 47.0 | 43.0 | 40.5 | 44.5 | 45 | 48 | 45 |
| Nat'l rubber(% rubber cover) | 80 | 80 | 80 | 80 | 80 | 90 | 90 | 90 |
| 11 min at 310° F. | 26.5 | 27.5 | 25.5 | 27.5 | 25.5 | 35 | 35 | 35 |
| Syn. rubber (% rubber cover) | 90 | 90 | 85 | 90 | 90 | 95 | 95 | 95 |
| Dynamic Flex (lbs) | | | | | | | | |
| High (Unflexed area) | 30 | 29 | 31 | 25.5 | 21.0 | | | |
| Low (Flexed area) | 11 | 7 | 7 | 0 | 8.5 | | | |
| Fatigue (kilocycles) | 732 | 429 | 725 | 484 | 379 | 500 | 500 | 75 |

Table 6

| Cords At Optimum Twist - Litzler Process | | | | |
|---|---|---|---|---|
| | (3 ply) Nylon Only | Nylon/ Aramid 2/1 | Nylon/ Aramid 1/2 | (3 ply) Aramid Only |
| Nylon Twist (s) | 8 | 8 | 8 | — |
| Aramid Twist (s) | — | 12 | 10 | 7 |
| Cord Twist (z) | 8 | 8 | 8 | 7 |
| Breaking Strength (pounds) | 72 | 88 | 146 | 186 |
| Lase at 7% (lbs) | 22 | 18 | 32 | — |
| Elongation (%) | 18 | 17 | 10 | 5 |
| Total Shrinkage (%) | 9.0 | 4 | 2.0 | 1.1 |
| Energy to Work[1] | 100 | 90 | 70 | 40 |
| Fatigue[1] | 100 | 95 | 40 | 20 |
| Flex[1] | 100 | 95 | 60 | 10 |

[1]Expressed as a percentage basis, using the Nylon 3 ply cord as 100.

In Table 6 the physical properties of the cords are compared to the three ply nylon, expressed as a percentage basis, using the nylon three ply cord as 100%.

The Litzler process relates to preparing the cords by a Litzer machine of the Litzer Company.

Inspection of Table 6 shows that the three ply nylon cord has an ultimate elongation of 18%, while the three ply aramid cord had an ultimate elongation of only 5%. Beneficially, the nylon/aramid cord of this invention were able to achieve an ultimate elongation more in the direction of the three ply nylon cord.

No lase at 7 percent elongation is shown for the aramid cord because it would break at about a 5 percent elongation.

Further inspection of Table 6 shows that the breaking strength of the nylon cord was 72 pounds while the breaking strength of the aramid cord was 186 pounds. Beneficially, the nylon/aramid cord prepared according to this invention was able to show an enhanced breaking strength over the nylon ply cord in the direction of the aramid cord.

Additionally, inspection of Table 6 readily shows that the enhanced breaking strength of the cord prepared according to this invention is not a simple linear function of nylon/aramid ratio nor is the beneficial ultimate elongation.

Fatigue life is especially enhanced by preparing the cord according to this invention as is demonstrated in Table 6. Here it is important to appreciate that heretofore it was expected that fatigue life would be limited by the weakest yarn, in this case the aramid yarn. The fatigue life property was not understood to be cumulative or additive in nature when yarns are mixed. Instead, in the cord of this invention, the fatigue life in enhanced by the inclusion of the nylon yarn while achieving the breaking strength benefit of the aramid yarn.

In the description of this invention, it has been described that the fabric of the cord of this invention, particularly when having a rubber coating calendered thereon, has a beneficial utility in a pneumatic rubber tire as reinforcement. Such a reinforcing member in a pneumatic rubber tire can be of the reinforcing carcass extending from bead-to-bead and thus reinforcing the sidewall and treated support areas as well as the belt member positioned between the carcass plies and treated or the chipper member positioned inwardly of the carcass reinforcing member in the vicinity of the bead of the tire.

In the further description of this invention, although the primary utility of the cord fabric has been directed to use as a reinforcing member for a pneumatic tire, it is intended the invention include industrial products, including rubber belts inclusive of V-belts, and rubber hose containing such a fabric as a reinforcing member thereof.

In such use as a reinforcing member, the cord fabric can be of the cords of this invention assembled in a substantially parallel fashion, loosely tied together by a cross-woven pick or weft cord in the manner of a tire cord fabric comprised of about five to about 40, preferably about 10 to about 30, cords per inch. Alternatively, particularly in the case of a relatively flat industrial belt, the fabric can be of the square woven type.

While certain representative embodiments and details have been shown for the purpose of illustrating the invention, it will be apparent to those skilled in this art that various changes and modifications may be made therein without departing from the spirit or scope of the invention.

What is claimed is:

1. In a textile cord comprised of plies of cabled yarns, the improvement which comprises a cord composite comprised of a plurality of dissimilar plies of individual yarns helically cabled together, having one to six plies of aramid yarn characterized by having a modulus, at one percent elongation and at a twist of about one turn per inch, in the range of about 250 to about 600 grams per denier and one to twelve plies individually selected from polyester and/or nylon yarns characterized by having a modulus, at one percent elongation and at a twist of about one turn per inch, in the range of about 20 to about 100 grams per denier, where said yarns are cabled by twisting together helically about one another to form a cord having a twist of cabled yarns, or plies, in the range of about two to about 16 turns per inch, where said aramid yarn has a residual twist in its ply in the range of about one to about six turns per inch opposite the cord twist and said polyester or nylon yarn has a residual twist in its ply in the range of about 0 to about 0.5 turns per inch opposite the cord twist, so that (A) at an initial cord elongation, under an initial longitudinal tensile stress, the primary load bearing ply is the polyester or nylon as such yarn stretches while said aramid yarn extends without appreciable stretch, and (B) after additional elongation of the cord, under appreciable additional longitudinal tensile stress, the primary load bearing yarn is the aramid as it reaches substantially full extension.

2. The textile cord of claim 1 where said cabled yarns break substantially simultaneously at ultimate elongation of said cord.

3. The textile cord of claim 1 comprised of a plurality of dissimilar plies of individual yarns helically cabled together, having one ply of aramid yarn characterized by having a modulus, at one percent elongation and at a twist of about one turn per inch in the range of about 300 to about 550 grams per denier, and one to two plies of either polyester or nylon yarns characterized by having a modulus, at one percent elongation and at a twist of about one turn per inch in the range of about 25 to about 60 grams per denier, where said yarns are cabled by twisting together helically about one another to form a cord having a twist of cabled yarns, or plies, in the range of about 8 to about 14 turns per inch and where the ratio of the total of nylon and polyester plies to aramid plies is from 1/1 to 4/1.

4. The textile cord of claim 1 in the form of a tire cord fabric comprised of about 5 to about 40 cords per inch, measured on a single ply basis, loosely woven together by a pick or weft cord.

5. The textile cord in the form of a tire cord fabric according to claim 4, having calendered thereon a coating of rubber having a thickness in the range of about 5 to about 50 mils on each side of said fabric.

6. A pneumatic rubber tire comprised of a carcass with a tread over the road engaging portion of the carcass and the fabric of claim 5 as a reinforcing member within the body of said carcass in at least the portion thereof opposite said tread.

7. The textile cord of claim 1 where said aramid yarn is of a long chain synthetic aromatic polyamide in which at least 85% of the amide linkages are attached directly to two aromatic rings.

8. The textile cord of claim 7 where said aramid yarn is of a poly(p-phenyleneterephthalamide).

9. The textile cord of claim 1 where said nylon yarn is of long chain synthetic polyamide in which the amide linkages are attached directly to one or more aliphatic or cycloaliphatic groups.

10. The textile cord of claim 9 where said nylon yarn is of poly(hexamethylene adipamide).

11. The textile cord of claim 1 where said polyester yarn is of a pliable elastic fiber having a high degree of orientation along the fiber axis derived from reacting at least one glycol selected from ethylene glycol and propylene glycol with at least one dicarboxylic acid selected from terephthalic acid, isophthalic acid and stilbene carboxylic acid.

12. The textile cord of claim 11 where said polyester yarn is of a polyester comprised of at least 85% ethylene glycol terephthalate.

13. The textile cord of claim 1 where said aramid yarn comprises about 800 to about 1200 filaments, said nylon yarn comprises about 140 to about 210 filaments, and said polyester yarn comprises about 190 to about 250 filaments.

14. The pneumatic tire of claim 6 where in the cord of said textile fabric, said cord is comprised of one ply of aramid yarn characterized by having a modulus at one percent elongation and at a twist of about one turn per inch in the range of about 300 to about 550 grams per denier and one to two plies of either polyester or nylon yarns characterized by having a modulus at one percent elongation and at a twist of about one turn per inch in the range of about 25 to about 60 grams per denier, where said yarns are cabled by twisting together helically about one another to form a cord having a twist of cabled yarns, or plies, in the range of about 8 to about 14 turns per inch; where said aramid yarn comprising about 800 to about 1200 filaments, said nylon yarn comprising about 140 to about 210 filaments and said polyester yarn comprising about 190 to about 250 filaments; where said aramid yarn is of a long chain synthetic aromatic polyamide in which at least 85% of the amide linkages are attached directly to two rings; where said nylon yarn is of a long chain synthetic polyamide in which the amide linkages are attached directly to one or more aliphatic or cycloaliphatic groups; and where said polyester yarn is of a pliable elastic fiber having a high degree of orientation along the fiber axis derived from reacting at least one glycol selected from ethylene glycol and propylene glycol with at least one dicarboxylic acid and where the ratio of the total of nylon or polyester plies to aramid plies is from 1/1 to 4/1.

15. The pneumatic tire of claim 14 where in said cord of said textile fabric, said aramid yarn is of a poly(p-phenyleneterephthalamide), said nylon yarn is of poly(hexamethylene adipamide) and where said polyester yarn is of a polyester comprised of at least 85% ethylene glycol terephthalate.

16. The pneumatic tire of claim 14 where said textile fabric is in the form of the reinforcing carcass, belt or chipper member.

17. A rubber structured article having, as a reinforcing member, the textile cord of claim 1.

18. The rubber article of claim 17 in the form of an industrial rubber belt, V-belt or hose.

* * * * *